(12) United States Patent
Lohweg et al.

(10) Patent No.: US 7,609,878 B2
(45) Date of Patent: Oct. 27, 2009

(54) METHOD FOR ANALYZING THE COLOR DEVIATIONS IN IMAGES USING AN IMAGE SENSOR

(75) Inventors: Volker Lohweg, Bielefeld (DE); Harald Heinrich Willeke, Paderborn (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 672 days.

(21) Appl. No.: 10/521,762

(22) PCT Filed: Jun. 27, 2003

(86) PCT No.: PCT/DE03/02146

§ 371 (c)(1),
(2), (4) Date: Jan. 21, 2005

(87) PCT Pub. No.: WO2004/017034

PCT Pub. Date: Feb. 26, 2004

(65) Prior Publication Data

US 2005/0259869 A1 Nov. 24, 2005

(30) Foreign Application Priority Data

Jul. 26, 2002 (DE) .................. 102 34 085

(51) Int. Cl.
*G06K 9/00* (2006.01)
(52) U.S. Cl. .................. 382/162; 345/589
(58) Field of Classification Search .......... 382/162; 345/589–593
See application file for complete search history.

(56) References Cited

U.S. PATENT DOCUMENTS 5,237,517 A  8/1993  Harrington et al.
5,268,753 A * 12/1993 Yamaguchi .............. 358/527
5,710,644 A  1/1998  Ohta
5,999,636 A * 12/1999 Juang ...................... 382/112
6,486,981 B1 * 11/2002 Shimura et al. .......... 358/500
6,751,348 B2 * 6/2004 Buzuloiu et al. ......... 382/165
6,911,963 B2 * 6/2005 Baba et al. ............... 345/88
6,950,554 B2 * 9/2005 Shiratani ................. 382/224
2002/0021444 A1  2/2002  Macfarlane et al.

FOREIGN PATENT DOCUMENTS

| DE | 44 19 395 A1 | 12/1995 |
| DE | 691 26 647 T2 | 11/1997 |
| DE | 692 24 812 T2 | 6/1998 |
| DE | 198 38 806 A1 | 2/2000 |
| EP | 0 473 432 B1 | 6/1997 |

OTHER PUBLICATIONS

"Color Indexing," Michael J. Swain, Dana H. Ballard; Int'l Journal of Computer Vision, Nov. 7, 1991, No. 1, pp. 11-32.

* cited by examiner

*Primary Examiner*—Vikkram Bali
*Assistant Examiner*—Eueng-Nan Yeh
(74) *Attorney, Agent, or Firm*—Jones, Tullar & Cooper, P.C.

(57) ABSTRACT

Color deviations of images are analyzed using a sensor. The received image sensor signal is analyzed pixel by pixel. An image sensor signal is produced for each color channel from a plurality of color channels. An image sensor signal from a first channel, and one from a second channel, are combined. An output signal of a first color contrast channel is generated. Now an image sensor signal from a third channel is combined with the ones from the first and second image sensors. An output signal of a second color contrast channel is generated. The outputs of these color contrast channels are classified.

14 Claims, 2 Drawing Sheets

METHOD FOR ANALYZING THE COLOR DEVIATIONS IN IMAGES USING AN IMAGE SENSOR

CROSS-REFERENCE TO RELATED APPLICATIONS

This U.S. patent application is the U.S. national phase, under 35 USC 371 of PCT/DE2003/002146, filed Jun. 27, 2003, published as WO 2004/017034 A1 on Feb. 26, 2004 and claiming priority to DE 102 34 085.4 filed Jul. 26, 2002, the disclosures of which are expressly incorporated herein by reference.

FIELD OF THE INVENTION

The present invention is directed to methods for using an image sensor for analyzing color deviations in images. The image signal received from the image sensor is analyzed pixel by pixel.

BACKGROUND OF THE INVENTION

The trichromatic model that is used most frequently in technology for describing additive color images is the RGB model. By utilization of the RGB model, an image space is described by the three basic or primary colors, red, green and blue. It is a particular disadvantage, in connection with this model, that the color description performed by the RGB model does not correspond to the color perception of the human eye, since the reaction of the human perception, i.e. the detection through the sensory organs, is not taken into consideration in the RGB model.

DE 44 19 395 A1 discloses a method for analyzing color images by the use of an image sensor, whose image signals are analyzed pixel by pixel. In the process, the image signals are separated in accordance with colorfulness and with brightness.

DE 692 24 812 T2 describes a method for image processing. RGB signals are non-linearly transformed into color signal values L, C1, C2.

A method for classifying color images by the use of fuzzy logic is known from DE 198 38 806 A1.

USSN 2002/021,444 A1 describes calculation specifications for image processing with the use of weighting factors for the individual color components.

A method for analyzing color deviations in images is set forth in the article by Michael J. Swain and Dana H. Ballard, "Color Indexing," Internat'l. Journal of Computer Vision, 7:1, 11-32 (1991), XP000248428. Compensation color channels are generated from color channels, which compensation color channels correspond to the receptive fields of the human eye. These compensation color channels are used for preparing histograms.

EP 0 473 432 B1 discloses an image analysis method which provides a transformation with several input signals with associated calculation specifications.

SUMMARY OF THE INVENTION

The object of the present invention is directed to providing methods using an image sensor for analyzing color deviations of images.

In accordance with the present invention, this object is attained by providing an image sensor that is used to analyze color deviations of images. An image signal received from the image sensor is analyzed pixel by pixel. An image sensor signal is generated for each of the several color channels. Image sensor signals from two of the channels are linked by a calculation specification and an output signal of a first compensation channel is generated. Linkage of the image sensor channel of the third color channel with the image sensor signals of the first and second color channels is accomplished by using a second calculation specification to generate an output signal of a second compensation color channel. These color channels are classified.

Three cone types, which each absorb light in different spectral ranges, exist in the human eye. The maximum absorption of the S-cone type lies in the blue range, namely at 420 nm. The M-cone type absorbs maximally in the green range, namely at 534 nm. The L-cone type has its absorption maximum at 564 nm in the yellow/red spectral range. Seeing by use of three types of cones is called trichromatic vision. An individual color perception is triggered by the different excitation strengths of the individual cone types. Identical excitation of all three types of cones leads to the perception of the color white. However, by use of the trichromatic vision model, it is not possible to explain color perception phenomena, such as color antagonism and color constancy, for example.

Color antagonism means that defined colors can never be seen in transitions, so that no color transition between these colors is possible. Colors which show color antagonism are called compensation or complementary colors. The color pairs red/green and blue/yellow, as well as black/white should be mentioned here.

With color constancy, the different spectral distribution of the light, which for example is a function of the weather or daylight conditions, is compensated.

Hering developed his compensation color theory in 1920 to explain these color perception phenomena in a way that was different from the classic trichromatic color model. The compensation color model assumes that the cones are arranged in receptive fields, namely in blue/yellow fields and in red/green fields. Receptive fields are understood here to be neurons, and describe the manner in which the light signals coming from the cones are further processed by the neurons. Substantially two types of receptive fields are responsible for color vision. The first receptive field obtains its input from the L- and M-cones. The second receptive field obtains its input from the S-cones, together with differently weighted signals from the L- and M-cones. It is assumed that subtractive color mixing of the excitations of the cones is performed in the plane of the neurons or in these receptive fields.

In the process for analyzing color deviations of printed images, an image signal, that is received from the image sensor, is analyzed pixel by pixel in a manner which is generally known. In accordance with the present invention, the image signal is recorded by the image sensor in three color channels, which are separated from each other, and which are used for reproducing the three cone types in the human eye with their different spectral sensitivities. Each one of the three color channels has a characteristic spectral sensitivity. The two receptive fields, representing the second stage of color processing in human vision, are simulated by an appropriate linkage of the image sensor signals of the three color channels, which are separated from each other. In the technical model, the red/green field of human color perception represents the first compensation color channel. The output signal of the first compensation color channel is generated by the linkage of the image sensor signal of a first color signal with the image sensor signal of a second color signal. Linkage is performed by the utilization of a calculation specification consisting of at least one arithmetic rule. In the technical model, the blue/yellow field is generated by linking the image sensor signal of a third color channel with a combination of the image sensor signals of the first and second color channels. In the technical model, the blue/yellow field corresponds to the second compensation color channel. The output signal of the second compensation color channel is generated by use of the above described linkage. Linkage is performed by a second calculation specification consisting of at least one arithmetic rule. A classification of the output signals from the two compensation color channels takes place in the next step for evaluating the examined pixel. It is decided by this classification whether the image content of the examined pixel corresponds to a defined class, by the use of which classification an acceptable/unacceptable determination can be made.

It is without great importance, for the principle of the present invention, in which spectral range the three color channels of the method are located, so long as these three color channels are color channels which are separated from each other. A preferred embodiment of the present invention is one in which the three color channels correspond to the basic colors of the RGB model, namely red, green and blue. This has the advantage that it is possible to use a widely distributed color model.

To match the spectral sensitivity of each color channel to the spectral perception of the corresponding cone of the retina of the human eye, it is beneficial if the spectral sensitivity of every color channel can be matched to spectral sensitivities of the cones.

It is of secondary importance, for the principle of the present invention, in which way the two output signals of the compensation color channels are generated. One possibility consists in that one arithmetic rule of the first calculation specification provides the formation of a weighted differentiation between the image sensor signals of the first color channel, and/or an arithmetic rule of the second calculation specification provides the formation of a weighted differentiation between the weighted sum of the image sensor signals from the first and second image sensor channels and the third color channel.

In accordance with a further preferred embodiment of the present invention, at least one signal in at least one compensation color channel is subjected to a transformation specification, and in particular is subjected to a non-linear transformation specification, after and/or prior to the linkage. A transformation has the particular advantage that the digital character of electronically generated recordings can be taken into consideration. By the use of the transformation specifications, it is also possible to transform a signal from the color space into a space in which the excitation of the cones can be described. In many preferred embodiments, the signals in both of the compensation color channels are subjected to a transformation.

With human vision, the receptive fields are characterized by a low pass behavior. It is thus useful if at least one signal in at least one compensation color channel is filtered by the use of a low pass filter. In accordance with a particularly preferred embodiment of the present invention, the output signal of each compensation color channel is filtered by the use of a low pass filter.

In accordance with a particularly preferred embodiment of the present invention, the method for analyzing color deviations in images, using an image sensor, has a learning mode of operation and an inspection mode of operation. In the course of the learning mode of operation, at least one reference image is analyzed pixel by pixel. The two output signals from the two compensation color channels formed by the reference image are stored in a reference memory. This means that the image content of the reference image is actually recorded in three color channels, that the image signals of each color channel are matched in accordance with perception, and that these image signals are subsequently linked with each other, in accordance with the compensation color model. Then, the output signals from each compensation color channel are stored, pixel by pixel, in the reference data memory. In a subsequent inspection mode, the output signals from the appropriate pixel, that are generated by a test image, are compared with the corresponding value in the reference data memory, and a classification decision is made regarding the acceptability of the test image.

In order to take permissible fluctuations of the image content, as well as to take fluctuations of the conditions existing during the image recording, into consideration, it is useful if the values stored in the reference data memory are formed by analyzing several reference data sets, so that, for each value in the reference data memory, a permissible tolerance window is provided, and within which tolerance window an output signal value of a compensation color channel, generated during the image inspection, can fluctuate. In this case, the reference variable of the output signal of a compensation color channel can be determined, for example, by forming the average arithmetic value of the individual values resulting from the reference data sets. The tolerance window can be determined, for example, from the minimum and maximum values of the output signal, or from the standard deviation of the output signals of the compensation color channels generated from the examined reference images.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENT

Figure 1:
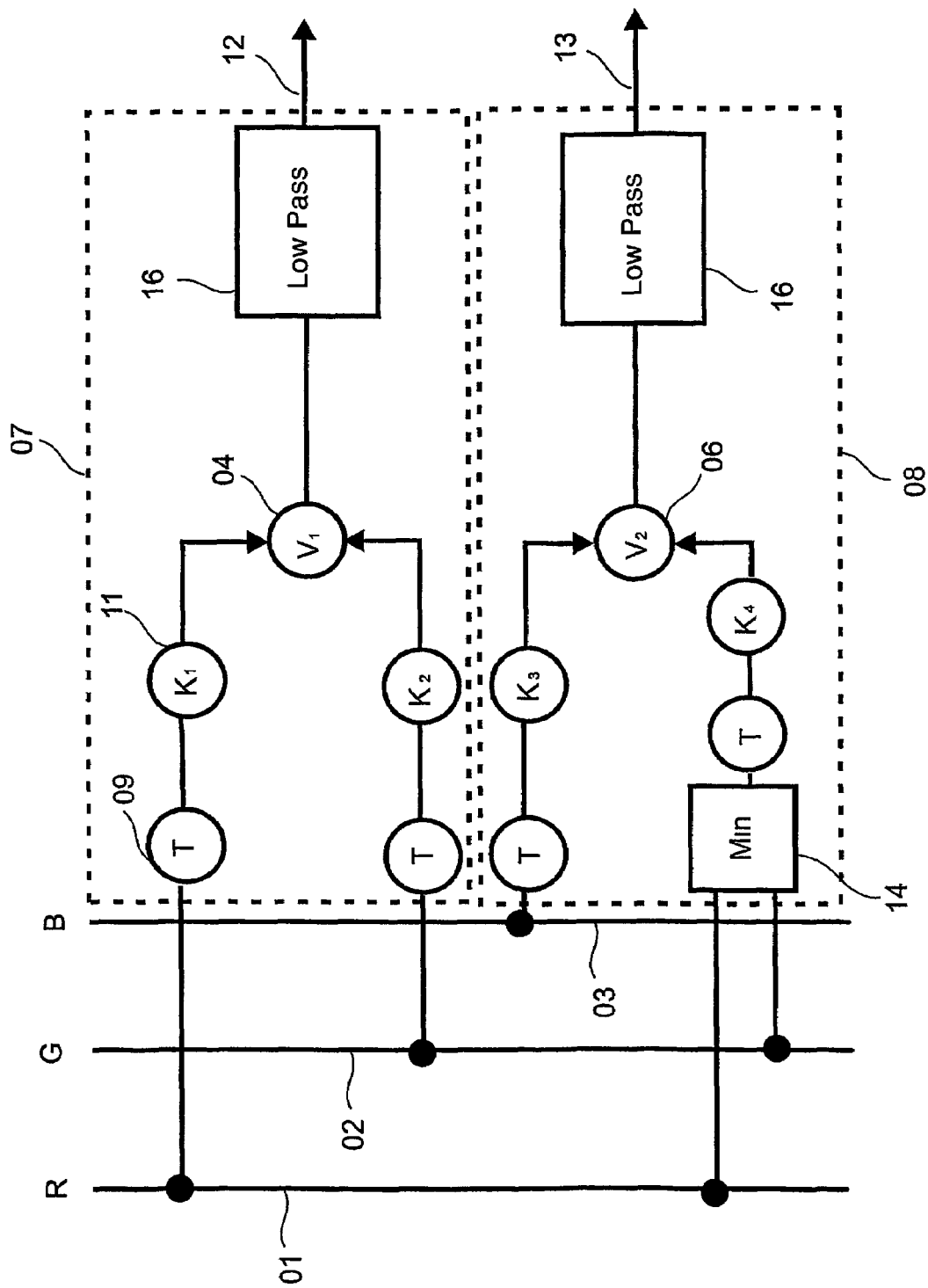
FIG. 1, a schematic representation of a method for analyzing color deviations in print images with a compensation color model in accordance with the present invention, and in FIG. 2, a flow chart of the learning and inspection mode.

As may be seen in FIG. 1, recording of image signals of an image is accomplished by an image sensor and takes place in three color channels 01, 02, 03, which are separated from each other. In the present preferred embodiment, the three separated color channels 01, 02, 03 are the color channels red 01, green 02 and blue 03. Each one of the three color channels has an adjustable spectral sensitivity. This has, as an advantage, that the characteristic of each color channel 01, 02, 03 recorded by the image sensor can be matched to the conditions of the existing set of problems. Thus, it is possible, for example, to match the spectral sensitivity of a color channel 01, 02, 03 to the spectral sensitivity of the appropriate cone of the retina of the human eye.

In the method for analyzing the color deviations in images in accordance with the present invention, the spectral content of an image is analyzed pixel by pixel. For modeling the two receptive fields, red/green and blue/yellow of the human eye, the image sensor signals of the color channels 01, 02, 03 are linked with each other in accordance with the method of the present invention. Prior to such an actual linkage of the image sensor signals, by the use of calculation specifications 04, 06, each image sensor signal in two resultant compensation color channel 07, 08 is subjected to a non-linear transformation 09. The digital character of the electronically generated recordings is taken into consideration by this. Subsequently, each signal is weighted with a coefficient $K_I$ (I=1 . . . 4). By the use of this process, it is achieved that a pure intensity change of the initial image does not provide a contribution to one of the output signals 12, 13 of the first and second compensation color channels 07, 08. The generation of the output signals 12, 13 of the first and second compensation color channels 07, 08 takes place in a manner analogously to the generation of the signals of the receptive fields in the human retina. This means that a linkage is performed by the utilization of the calculation specifications 04, 06 of the color channels 01, 02, 03 in a manner corresponding to the linkage of the cones of the human retina. To form the output signal 12 of the red/green compensation color channel 07, the image sensor signals of the red color channel 01 and the image sensor signals of the green color channel 02 are linked with each other by use of the first calculation specification 04. To form the output signal 13 of the blue/yellow compensation color channel 08, in the present preferred embodiment the image sensor signal of the blue color channel 03 is linked with the minimum one signal 14 of the image sensor signals of the red color channel 01 and of the green color channel 02 by use of the calculation specification 06. The receptive fields of the human retina are characterized by a low pass behavior. Accordingly, in the present preferred embodiment, the signals obtained by each linkage are subjected to a low pass filtering process 16 using a Gauss low pass filter.

Figure 2:
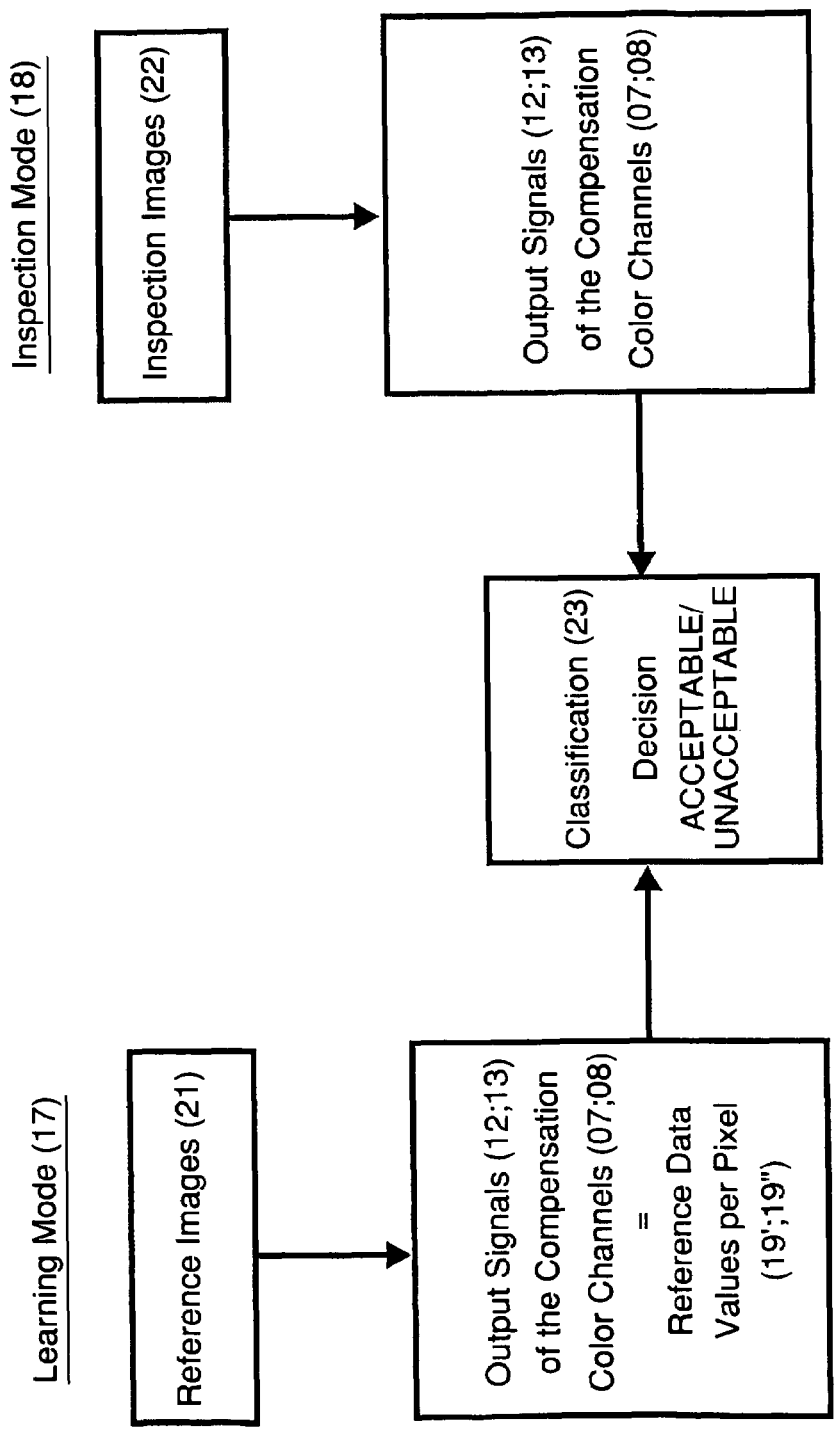

FIG. 2 is a schematic depiction of the actual inspection of printed products, which actual inspection is performed in two stages, namely in a first, learning mode 17 and a downstream connected second, inspection mode 18. The aim of the inspection of printed products, in the learning mode 17, is the generation, pixel by pixel, of reference data values 19, which are then compared, in the subsequent inspection mode 18, with the output signals 12, 13 of the compensation color channels 07, 08 of the appropriate inspected pixels. In the learning mode 17, the image contents of one reference image 21, or the image contents of several reference images 21, are analyzed. The image contents of each pixel in the reference image or images are entered into three color channels 01, 02, 03 and a subsequent adaptation with respect to perception of the image signals of each color channel 01, 02, 03, is performed. Further processing of the image sensor signals, in accordance with the above-described compensation color method, is performed. Then the output signals 12, 13 of the compensation color channels 07, 08 obtained for each pixel of the reference are stored in a reference data memory. It is useful, for the purpose of also taking into consideration permissible fluctuations of the reference images 21, if several reference images 21 are considered in the learning mode 17. Because of this consideration of several reference images, it is thus possible for the reference data values 19', 19" of each pixel that is stored in the reference data memory to have a defined permissible fluctuation tolerance. The fluctuation tolerance can be determined either by the use of minimum/maximum values, or from the standard deviation of the obtained data of the image contents of the reference images 21 of each pixel.

Then, in the actual inspection mode 18, a comparison, on a pixel by pixel basis, of the output signals 12, 13 of the first and second compensation color channels 07, 08 of an inspection image 22, with the reference data values 19', 19" taken from the reference data memory takes place. The comparison of the image values with the reference values can be performed by the use of a linear or a non-linear classifier 23, and in particular by the use of threshold value classifiers, Euclidic distance classifiers, Bayes classifiers, fuzzy classifiers, or artificial neuronic networks. Subsequently an acceptable/unacceptable decision is made regarding the inspection image 22.

While a preferred embodiment of a method for analyzing the color deviations in images using an image sensor, in accordance with the present invention, has been set forth fully and completely hereinabove, it will be apparent to one of skill in the art that various changes in, for example, the specific image being inspected, the procedures to be followed once the image has been inspected, and the like could be made without departing from the true spirit and scope of the present invention which is accordingly to be limited only by the following claims.

What is claimed is:

1. A method for analyzing color deviation of printed images including:
   providing a printed image;
   providing a printed image sensor;
   using said printed image sensor for generating separate pixel by pixel image sensor signals of each of first, second and third color channels of said printed image;
   providing said first, second and third color channels as red, green and blue color channels, respectively, said first, second and third color channels reproducing color perceptions generated in a human eye;
   providing a separate printed image sensor signal for each of said first, second and third separate color channels;
   providing a first calculation specification consisting of at least a first arithmetic rule;
   linking said first color channel printed image sensor signal with said second color channel printed image sensor signal by using said first calculation specification;
   generating a first printed image output signal of a first resultant compensation color channel representing a red/green receptive field of color perception of a human eye using said first calculation specification linked first and second color channel image sensor signals;
   providing a second calculation specification consisting of at least a second arithmetic rule;
   linking said third color channel image sensor signal with a combination of said first and second color channel image sensor signals by using said second calculation specification;
   generating a second printed image output signal of a second resultant compensation color channel representing a blue/yellow receptive field of color perception of a human eye using said second calculation specification linked third color channel image sensor signal and said combination of said first and second color channel image signals;
   selecting said first calculation specification for forming a weighted difference between said second color channel image sensor signal and said first color channel image sensor signal corresponding to a first color perception of a human eye;
   selecting said second calculation specification for forming a weighted difference between said combination of said first color channel image sensor signal and said second color channel image sensor signal, and said third color channel image sensor signal corresponding to a second color perception of a human eye;
   providing at least one reference image;
   generating first and second reference image output signals of first and second reference image compensation channels;

providing a reference memory and storing said first and second reference image output signals of said first and second reference image compensation channels in said reference memory;

storing said first and second printed image output signals of said first and second printed image compensation changes in said reference memory;

providing a classification system;

using said classification system for comparing said first and second reference image output signals with said first and second printed image output signals in said reference memory;

classifying said first and said second output signals of said first and second compensation color channels, representing said receptive fields of color perception of a human eye using said classification system; and determining an acceptability of said human eye color perception of said printed image based on said classification of said first and second printed image output signals with said first and second reference image output signals performed in said classification system.

2. The method of claim 1 further including providing each of said first, second and third color channels with adaptable spectral sensitivity.

3. The method of claim 1 further including providing at least one of said first and second calculation specification as a non-linear transformation.

4. The method of claim 1 further including weighting each of said first, second and third color channel image sensor signals with a coefficient.

5. The method of claim 1 further including providing a low pass filter in at least one of said first and second compensation color channels.

6. The method of claim 1 including selecting said classification system from linear and non/linear classification systems including threshold value classifiers, Euclidic distance classifiers, Bayes classifiers, fuzzy classifiers and artificial neuronic networks.

7. The method of claim 1 further including providing said reference image output signals for a plurality of said reference images in said reference data memory and using said reference image output signals for determining a tolerance window for said reference image output signals.

8. A method for analyzing color deviation of printed images including:

providing a printed image;

providing a printed image sensor;

using said printed image sensor for generating separate pixel by pixel image sensor signals of each of first, second and third color channels of said printed image;

providing said first, second and third color channels as red, green and blue color channels, respectively, said first, second and third color channels reproducing color perceptions generated in a human eye;

providing a separate printed image sensor signal for each of said first, second and third separate color channels;

providing a first calculation specification consisting of at least a first arithmetic rule;

linking said first color channel printed image sensor signal with said second color channel printed image sensor signal by using said first calculation specification;

generating a first printed image output signal of a first resultant compensation color channel representing a red/green receptive field of color perception of a human eye using said first calculation specification linked first and second color channel image sensor signals;

providing a second calculation specification consisting of at least a second arithmetic rule;

linking said third color channel image sensor signal with a combination of said first and second color channel image sensor signals by using said second calculation specification;

generating a second printed image output signal of a second resultant compensation color channel representing a blue/yellow receptive field of color perception of a human eye using said second calculation specification linked third color channel image sensor signal and said combination of said first and second color channel image signals;

selecting said first calculation specification for forming a weighted difference between said second color channel image sensor signal and said first color channel image sensor signal corresponding to a first color perception of a human eye;

selecting said second calculation specification providing a linkage of a minimum one of the first color channel image sensor signal and the second color channel image sensor signal, with said third color channel image sensor signal corresponding to a second color perception of a human eye;

providing at least one reference image;

generating first and second reference image output signals of first and second reference image compensation channels;

providing a reference memory and storing said first and second reference image output signals of said first and second reference image compensation channels in said reference memory;

storing said first and second printed image output signals of said first and second printed image compensation changes in said reference memory;

providing a classification system;

using said classification system for comparing said first and second reference image output signals with said first and second printed image output signals in said reference memory;

classifying said first and said second output signals of said first and second compensation color channels, representing said receptive fields of color perception of a human eye using said classification system; and determining an acceptability of said human eye color perception of said printed image based on said classification of said first and second printed image output signals with said first and second reference image output signals performed in said classification system.

9. The method of claim 8 further including providing each of said first, second and third color channels with adaptable spectral sensitivity.

10. The method of claim 8 further including providing at least one of said first and second calculation specification as a non-linear transformation.

11. The method of claim 8 further including weighting each of said first, second and third color channel image sensor signals with a coefficient.

12. The method of claim 8 further including providing a low pass filter in at least one of said first and second compensation color channels.

13. The method of claim 8 including selecting said classification system from linear and non/linear classification systems including threshold value classifiers, Euclidic distance classifiers, Bayes classifiers, fuzzy classifiers and artificial neuronic classifiers.

14. The method of claim 8 further including providing said reference image output signals for a plurality of said reference images in said reference data memory and using said reference image output signals for determining a tolerance window for said reference image output signals.

\* \* \* \* \*